United States Patent Office 3,265,569
Patented August 9, 1966

3,265,569
CURATIVE TREATMENT OF DOMESTIC ANIMALS
William F. Jackson, Lakeland, Fla., assignor to Hart Chemical Corporation, Tampa, Fla., a corporation of Florida
No Drawing. Filed July 15, 1965, Ser. No. 472,359
5 Claims. (Cl. 167—53)

This invention relates to a curative treatment of domestic animals such as dogs infected with *Demodex canis* by injecting the animal with regular doses of 2,6-dihalo-4-nitro-phenol and non-toxic salts thereof.

The compounds used are preferably 2,6-diiodo-4-nitro-phenol, 2,6-dibromo-4-nitro-phenol, 2-iodo-6-bromo-4-nitro-phenol and non-toxic salts of said phenols in which the cation is alkali-forming metal, typically sodium, potassium, calcium or the like.

The compounds may be dissolved in an aqueous or oily carrier and injected into the animal in typical dosages ranging from about 2.5 to 5 milligrams per pound of animal body weight. Typical carriers may be water, peanut oil, glycerol or the like.

According to the present invention the injection of the animal periodically for several treatments spaced several days apart, such as 7 to 10 days apart, using 3 to 7 periodic injections, was found to cure *Demodex canis*.

*Demodex canis*, commonly known as mange, is caused by a parasite that lives in the skin of an infected animal such as a dog. Without intending to be limited to theory, it appears that the metabolism of the parasite is largely dependent upon its surrounding environment which is, in turn, a result of the metabolism in, and resulting exudates upon, the host animal's skin. The injections of the dihalo-nitro-phenolic compounds of this invention greatly stimulate the metabolism of the host animal, increasing the surface temperature of the animal's skin and apparently the toxicity of skin exudates to such parasites therein.

In any case, it is found that the injections hereof destroy the parasites upon or in the animal's skin; typically, *Demodex canis*. It is also found that other skin parasites of animals such as fleas, ticks or mites are usually destroyed simultaneously. The attendant diseases, that is, evidences of the presence of such parasites as scabies and mange, disappear during the treatment.

The following example, including actual histories, illustrates the practice of my invention.

Example I

In each case the dogs were injected with an aqueous solution containing sufficient 2,6-diiodo,4-nitro-phenol to impart 4 milligrams per pound of body weight of the animal.

(a) A setter, female, aged seven months, was treated for scabies with four injections at one-week intervals. No recurrence occurred in regular examinations over a five-month period.

(b) A pointer, female, aged ten months (before first heat) was given three injections at weekly intervals. There was no recurrence over a five-month period.

(c) A great Dane puppy, female, aged five months, was given three injections for scabies and had no recurrence within five months.

(d) A terrier puppy, male, seven months, had pustular dermacosis which is normally considered to be incurable. The dog was given five weekly injections and a completely normal skin and hair coat reappeared. The dog was thereafter lost and, after ten days, was found in poor condition. It had relapsed to the pustular skin condition and mange. The puppy was given two more injections within a one-week period which apparently relieved the condition permanently as regular examinations over a period of the next three months failed to show any recurring symptoms.

(e) Eight Dachshunds of both sexes, ranging in age from 4 to 8 months, all infected with mange, were cured with four weekly injections with no recurrences over a five-month period.

The above histories are typical of over forty experimental treatments of infected dogs with skin conditions indicating scabies and mange due to skin parasites in the animal for which the evidence of cure is similarly preponderant.

It is believed that the treatment is applicable to other domestic animals subject to such parasitic afflictions such as sheep, cats, etc.

The dosage is applied subcutaneously as described. It appears to affect the metabolism of the animal. Where the animal has a history of other metabolic troubles such as diabetes, the treatment with the dihalo-nitro-phenolic compounds hereof would be contra-indicated.

I claim:
1. Method of treatment of small animals infected with skin parasites comprising injecting the animal subcutaneously in several periodically-spaced treatments with a medicating agent selected from the group consisting of 2,6-dihalo-4-nitro-phenol and salts thereof.
2. Method of treatment of small animals infected with skin parasites as defined in claim 1 wherein the halogen components of the medicating agent are iodine.
3. The method of claim 1 wherein the dosage level of said medicating compounds is in the range of 2.5 to 5 miligrams per pound of body weight of the infected animal being treated.
4. The method of claim 1 wherein the animal is a dog infected with *Demodex canis*, the halogen of the medicating agent is iodine and the treatment consists of periodically-spaced injections of the medicating agent in quantity of about 4 milligrams per pound of animal body weight.
5. The method of treating dogs infected with mange, scabies and skin infections caused by the skin parasites ticks, mites, and fleas, comprising periodically injecting the animal in periods ranging from several days up to about ten days in a series of subcutaneous injections with from about 2.5 to 5 milligrams per pound of animal body weight of 2,6-diiodo-4-nitro-phenol and salts thereof.

No references cited.

JULIAN S. LEVITT, *Primary Examiner*.

STANLEY J. FRIEDMAN, *Assistant Examiner*.